May 4, 1954  M. B. HALL  2,677,808
POWER MONITOR
Filed April 11, 1946
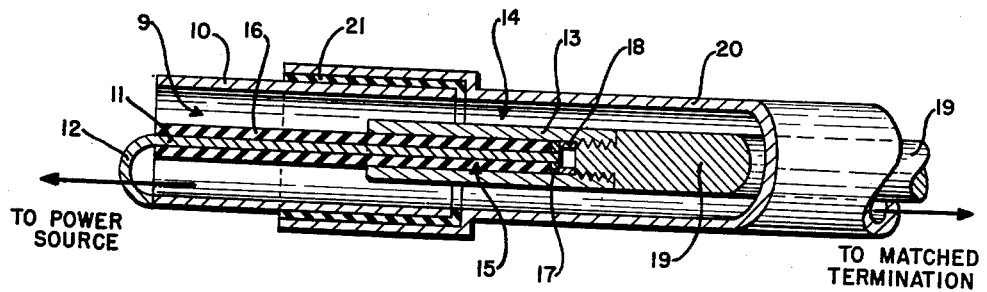
INVENTOR
MAURICE B. HALL
BY *M. O. Hayes*
ATTORNEY Patented May 4, 1954

2,677,808

UNITED STATES PATENT OFFICE 2,677,808

POWER MONITOR

Maurice B. Hall, Wilmington, Del., assignor, by mesne assignments, to the United States of America as represented by the Secretary of the Navy Application April 11, 1946, Serial No. 661,209

8 Claims. (Cl. 333—9)

The present invention relates to R.-F. power dividing apparatus and more particularly to such apparatus adapted to measure the power transmitted through a coaxial transmission line.

Heretofore, the power in a coaxial transmission line was measured by coupling a known portion of the total power out of the line by means of a directional coupler and measuring the magnitude of this portion by a conventional means such as a thermister and an associated thermister bridge. Determining the magnitude of R.-F. power by measuring only a small portion or sample of it is convenient because a sensitive low-level power measuring device can then be used, but this technique requires that the measuring device receive a fixed proportion of the total R.-F. power.

The directional coupler which was formerly used to perform this power extraction function introduced undesirable frequency sensitivity. The present invention contemplates the elimination of such sensitivity by apparatus employed in lieu of the directional coupler to divide the power in the coaxial line and couple out a predetermined portion thereof to the measuring apparatus.

A general object of the present invention is to provide a means for dividing the power in a coaxial transmission line.

Another object is to provide such a power divider which is matched into the coaxial line over an extremely broad band of frequencies.

A further object is to provide a means for measuring the R.-F. power in a coaxial transmission line.

Another object is to provide a coaxial line power measuring means which permits the unobstructed passage of a major portion of the power being measured to an external load.

These and further objects will be made apparent from the following specification and its accompanying figure which is a longitudinal cross-sectional view of one form of apparatus of the present invention.

Referring to the figure, R.-F. power measuring apparatus is shown having a coaxial transmission line 9 with outer cylindrical conductor 10 and inner cylindrical conductor 11. Joining these conductors is a conventional coupling structure in the form of a loop 12 which is associated with the source of the R.-F. oscillations whose power is to be measured.

Disposed between the center conductor 11 and the outer conductor 10 so as to be coaxial therewith is a cylindrical conductor 13. This intermediate conductor in combination with conductors 10 and 11 forms two concentric coaxial transmission lines 14 and 15 which are electrically in series with one another.

An important property of the lines 14 and 15 is that, with wall 13 made thin, the sum of their characteristic impedances equals the characteristic impedance of the coaxial line 9. With lines 14 and 15 having matched terminations, a frequency insensitive power divider is thus formed by the two concentric coaxial lines with the fraction of the power of line 9 entering line 15 given by the characteristic impedance ratio $$\frac{Z_{15}}{Z_9}$$

Center conductor 11 and intermediate sleeve conductor 13 are supported by a dielectric rod 16 whose presence does not appreciably affect operation of the apparatus shown.

In the apparatus shown, the R.-F. power in coaxial line 9 is determined by measuring the power intercepted by the small line 15. Disposed within line 15 is a power sensitive element 17 which may be a disc-shaped thermister. Thermisters are semiconductors which are commonly used for power measurements because of the fact that their resistance varies appreciably with temperature. The resistance of such an element, as measured accurately in a conventional bridge circuit (not shown), is thus an indication of the power being dissipated therein. One of a number of well known structures, for example, the semiconducting ring 18 may be employed to provide line 15 with a matched termination.

Power not entering coaxial line 15 continues without interruption down line 14 which has a solid center conductor 19 threaded into the sleeve conductor 13. Line 14 may be terminated in a conventional matched attenuator load (not shown) if the apparatus shown is to be used for power measurement only. If used for power monitoring, coaxial line 14 will transmit a major portion of the initial energy of line 9 to the desired external load.

With apparatus of the present invention, a convenient means of placing thermister element 17 in the external D.-C. bridge circuit is afforded by insulating the section 10 of the outermost cylindrical conductor from section 20. A D.-C. path including conductor 10, coupling loop 12, conductor 11, thermister 17, conductor 19, the low terminating impedance of coaxial line 14, and finally conductor 20 is thus formed which allows electrical connection to the power sensitive element without the requirement of internal wiring. Conductors 10 and 20 may be isolated from one another by the use of conventional coaxial line choke joints or, as is shown, by a thin layer 21 of insulation.

Apparatus of the present invention divides and permits measurement of the R.-F. power in a coaxial line without introducing frequency sensitivity, and in such a way as to permit a major portion of the power being measured to be transmitted to a useful load. The present apparatus need not be limited to the details shown which are employed chiefly for purposes of illustration. For example, power sensitive devices other than the thermister shown may be used in the present invention.

What is claimed is:

1. Apparatus for measuring the R.-F. power propagated in a coaxial transmission line, said coaxial line having a coupling means disposed at one end thereof, said coaxial line extending to a power dividing means, said dividing means being formed by the outer and inner conductors of said coaxial line and an intermediate cylindrical conductor disposed between said outer and inner conductors and coaxial therewith, the coaxial line formed by said intermediate cylindrical conductor and the inner conductor of said first mentioned coaxial line being terminated in its characteristic impedance by a power sensitive device, the coaxial line formed by the outer conductor of said first mentioned coaxial line and said intermediate cylindrical conductor being terminated in a matched load.

2. Apparatus for monitoring power in a coaxial transmission line having outer and inner conductors comprising, a probe inserted in and coaxial with said inner conductor, means for laterally insulating said probe from said inner conductor, said outer conductor being split into two overlapping portions, means for insulating said overlapping portions one from another, a thermistor connected between said probe and said inner conductor and matched in impedance thereto, and means for extracting power dissipated in said thermistor.

3. Apparatus for monitoring power in a coaxial transmission line having outer and inner conductors, a conducting probe having one end inserted coaxially within said inner conductor and having the other end formed into a loop and connected to said outer conductor, means for laterally insulating said one end of said probe from said inner conductor, a thermistor connected between said probe and said inner conductor and matched in impedance therewith, said coaxial transmission line also having a matched termination.

4. Apparatus for monitoring power in a coaxial transmission line, said apparatus comprising, a first cylindrical conductor formed into two overlapping portions, means insulating said overlapping portions one from the other, a second cylindrical conductor coaxially aligned within said first inner conductor, said second cylindrical conductor having an axial bore therein for a portion of its length, a third conductor having one end thereof coaxially fitted within said bore in said second conductor and having the other end formed in a loop and connected to said first conductor, means for laterally insulating said third conductor from said second conductor, said first conductor and the coextensive portion of said third conductor unenclosed by said second conductor forming a first coaxial transmission line, the coextensive portions of said second and third conductors forming a second coaxial transmission line, and said first and second conductors forming a third coaxial transmission line electrically in series with said second coaxial transmission line, said conductors being dimensioned whereby the sum of the characteristic impedances of said second and third coaxial transmission lines equals the characteristic impedance of said first coaxial transmission line, a matched load including a thermistor terminating said second coaxial line, and a matched termination for said third coaxial line.

5. A power monitor comprising a first cylindrical conductor, a second cylindrical conductor coaxially aligned within said first conductor and having an axial bore formed therein, a third conductor having one end thereof coaxially disposed within said axial bore substantially coextensively therewith and having the other end formed in a loop and connected to said first conductor, said first conductor and the coextensive portion of said third conductor unenclosed by said second conductor forming a first coaxial transmission line having a first characteristic impedance, the coextensive portions of said second and third conductors forming a second transmission line having a second characteristic impedance, and said first and second conductors forming a third coaxial line having a third characteristic impedance, a matched termination for said third coaxial line, and a matched load including a power sensitive thermistor terminating said second coaxial transmission line, whereby the power coupled to said apparatus by said first coaxial transmission line is divided between said thermistor and said matched termination in accordance with the ratio of the characteristic impedances of said second and first coaxial transmission lines.

6. Apparatus in accordance with claim 5 wherein said first cylindrical conductor is formed into two overlapping portions, and including means for insulating said overlapping portions from each other thereby permitting external connection to said first cylindrical conductor of means for measuring resistance changes of said thermistor.

7. Apparatus for dividing power in a coaxial transmission line, said apparatus comprising a first cylindrical conductor, a second cylindrical conductor coaxially aligned within said first cylindrical conductor, a third conductor coaxially disposed within said first and second conductors, said first and third conductors forming a first coaxial transmission line over a portion of the length of said first conductor, said second and third conductors forming a second coaxial transmission line over another portion of the length of said first conductor, a matched load consisting of a thermistor terminating said second coaxial transmission line in its characteristic impedance, and a third coaxial transmission line formed by said first and second conductors also having a matched termination.

8. Apparatus for dividing power in a coaxial transmission line comprising, first, second and third coaxial concentric cylindrical conductors, said first and third conductors having portions extending beyond the length of said second conductor, a first coaxial transmission line formed by said extended portions of said first and third conductors, a second coaxial transmission line formed by said second and third conductors, a thermistor connected as a matched load termination for said second line, a third coaxial transmission line formed by said first and second conductors, said second conductor serving as an outer conductor for said second line and as an inner conductor for said third line thereby effectively placing said second and third lines in series connection, and a load terminating said third line in its characteristic impedance whereby the sum of the impedances presented by said second and third lines matches the characteristic impedance of said first line.

References Cited in the file of this patent

UNITED STATES PATENTS

| Number | Name | Date |
|---|---|---|
| 2,195,717 | Cork | Apr. 2, 1940 |
| 2,364,526 | Hansell | Dec. 5, 1944 |
| 2,524,183 | Wheeler | Oct. 3, 1950 |